(12) United States Patent
Clapper et al.

(10) Patent No.: US 11,035,505 B2
(45) Date of Patent: Jun. 15, 2021

(54) SYSTEM, METHOD AND APPARATUS FOR IN-LINE REMOVABLE PIPE ASSEMBLY

(71) Applicant: North American Pipe Corporation, Houston, TX (US)

(72) Inventors: Joshua E. Clapper, Downingtown, PA (US); Dmitry Yashin, Haverford, PA (US); Roy L. Dean, Schwenksville, PA (US)

(73) Assignee: NORTH AMERICAN PIPE CORPORATION, Houston, TX (US)

( * ) Notice: Subject to any disclaimer, the term of this patent is extended or adjusted under 35 U.S.C. 154(b) by 409 days.

(21) Appl. No.: 15/880,305

(22) Filed: Jan. 25, 2018

(65) Prior Publication Data

US 2018/0224030 A1    Aug. 9, 2018

Related U.S. Application Data

(60) Provisional application No. 62/455,122, filed on Feb. 6, 2017.

(51) Int. Cl.
| | |
|---|---|
| *F16L 21/035* | (2006.01) |
| *F16L 19/06* | (2006.01) |
| *F16L 19/02* | (2006.01) |
| *F16L 37/14* | (2006.01) |
| *F16L 25/12* | (2006.01) |
| *F16L 21/06* | (2006.01) |
| *F16L 21/00* | (2006.01) |

(52) U.S. Cl.
CPC ......... *F16L 19/061* (2013.01); *F16L 19/0206* (2013.01); *F16L 21/005* (2013.01); *F16L 21/06* (2013.01); *F16L 25/12* (2013.01); *F16L 37/14* (2013.01)

(58) Field of Classification Search
CPC ....... F16L 21/005; F16L 21/02; F16L 21/035; F16L 21/06; F16L 21/065; F16L 25/12
USPC ........ 285/108, 337, 369, 417, 418, 110, 111, 285/112, 383, 231
See application file for complete search history.

(56) References Cited

U.S. PATENT DOCUMENTS

| | | | | |
|---|---|---|---|---|
| 2,457,438 | A | * 12/1948 | Bennett | ................... F16L 17/04 285/112 |
| 2,772,100 | A | 11/1956 | Kreissig et al. | |
| 3,485,515 | A | * 12/1969 | Frishof | ................. F16L 17/035 285/5 |
| 4,408,788 | A | 10/1983 | Beukema | |
| 4,417,755 | A | 11/1983 | Gittleman | |

(Continued)

FOREIGN PATENT DOCUMENTS

CN        1276046 A     12/2000

*Primary Examiner* — Aaron M Dunwoody
(74) *Attorney, Agent, or Firm* — Lempia Summerfield Katz LLC

(57) ABSTRACT

A pipe restraining system has first and second pipes. Each pipe has an axis and a groove adjacent an axial end thereof. A bushing bridges and hydraulically seals with the first and second pipes. First and second clamp rings are removably attach the bushing to a respective one of the first and second pipes. When the pipe restraining system is assembled, axial tensile loads passing through the first pipe are transmitted through the first clamp ring, the bushing and the second clamp ring to the second pipe. An axial distance between the first and second pipes remains substantially constant.

21 Claims, 8 Drawing Sheets

(56) References Cited

U.S. PATENT DOCUMENTS

| | | | |
|---|---|---|---|
| 4,448,448 A * | 5/1984 | Pollia | F16L 23/18 |
| | | | 285/112 |
| 5,320,391 A * | 6/1994 | Luthi | F16L 23/04 |
| | | | 285/365 |
| 5,662,360 A | 9/1997 | Guzowski | |
| 6,070,914 A | 6/2000 | Schmidt | |
| 6,488,318 B1 | 12/2002 | Shim | |
| 6,533,333 B1 | 3/2003 | Radzik | |
| 6,604,761 B1 | 8/2003 | Debalme et al. | |
| 6,921,115 B2 * | 7/2005 | Gill | F16L 23/16 |
| | | | 285/110 |
| 6,988,746 B2 | 1/2006 | Olson | |
| 7,284,310 B2 | 10/2007 | Jones et al. | |
| 7,410,193 B2 | 8/2008 | Guest | |
| 7,537,248 B2 | 5/2009 | Jones et al. | |
| 7,883,121 B2 | 2/2011 | Henry | |
| 7,900,974 B1 | 3/2011 | Plattner | |
| 8,777,277 B2 | 7/2014 | Dole et al. | |
| 9,169,952 B2 | 10/2015 | Horgan | |
| 9,297,484 B2 | 3/2016 | Beagen, Jr. | |
| 2005/0242585 A1 | 11/2005 | Dole et al. | |
| 2009/0021006 A1 | 1/2009 | Hobbs | |
| 2019/0032825 A1 * | 1/2019 | McNamara | F16L 41/021 |

* cited by examiner

SYSTEM, METHOD AND APPARATUS FOR IN-LINE REMOVABLE PIPE ASSEMBLY

This application claims priority to and the benefit of U.S. Prov. Pat. App. No. 62/455,122, filed Feb. 6, 2017, which is incorporated herein by reference in its entirety.

BACKGROUND OF THE INVENTION

Field of the Disclosure

The present invention relates in general to pipes and, in particular, to a system, method and apparatus for in-line removable pipe assemblies.

Description of the Prior Art

Conventional spline-type, restrained pipe joint systems typically have splines that are separate from the pipes. The splines can be lost during transportation or disassembly. Examples of such designs include U.S. Pat. Nos. 5,662,360, 7,284,310, and 7,537,248. There are no "push to lock" type pipe joints that rely on a spline that automatically "expands" to open, and then snaps into place. Some users would prefer a quicker installation of restrained joint pipe that does not require "reversibility" (i.e., the ability to take the joint apart after assembly), and yet still provide a robust pipe joint system. Thus, improvements in pipe restrained joints continue to be of interest.

SUMMARY

Embodiments of a system, method, assembly and apparatus for an in-line removable pipe assembly are disclosed. For example, a pipe restraining system has first and second pipes. Each pipe has an axis and a groove adjacent an axial end thereof. A bushing bridges and hydraulically seals with the first and second pipes. First and second clamp rings are removably attach the bushing to a respective one of the first and second pipes. When the pipe restraining system is assembled, axial tensile loads passing through the first pipe are transmitted through the first clamp ring, the bushing and the second clamp ring to the second pipe. An axial distance between the first and second pipes remains substantially constant.

In another embodiment, a coupling for forming a joint between at least two pipes is disclosed. The coupling has a bushing with a tubular profile, an axis, an axial length, a bore with an inner diameter, an exterior with an outer diameter, and clamp grooves on an exterior of the bushing. The bushing receives axial ends of pipes. First and second clamps are removably attached to a respective one of the clamp grooves in the bushing and a respective one of the pipes.

Another versions of a coupling for forming a joint between pipes includes a bushing with a tubular profile, an axis, an axial length, a bore with an inner diameter, and an exterior with an outer diameter. The bushing receives axial ends of the pipes. First and second clamps are removably attached to the bushing and to a respective one of the clamp grooves in a respective one of the pipes.

Versions of a pipe assembly includes a bushing with a tubular profile, an axis, bushing axial ends, and a bore with inner seal grooves. First and second pipes are mounted in the bore of the bushing. Each pipe has a pipe axial end and an outer clamp groove. A distance A is defined as an axial overlap distance from one of the bushing axial ends to a respective pipe axial end. A distance B is defined as an axial separation distance from one of the bushing inner seal grooves to a respective pipe outer clamp groove, and B>A.

An examples of a pipe restraining system includes first and second pipes, each having an axis and a groove adjacent an axial end thereof. A bushing bridges and hydraulically seals with the first and second pipes. The bushing is threaded. First and second nuts are configured to thread to the bushing and removably attach the bushing to a respective one of the first and second pipes. When the pipe restraining system is assembled, axial tensile loads passing through the first pipe are transmitted through the first nut, the bushing and the second nut to the second pipe. An axial distance between the first and second pipes remains substantially constant.

Embodiments of a system for restraining pipes includes first and second pipes, each having an axis and a groove adjacent an axial end thereof. A bushing bridges and hydraulically seals with the first and second pipes. First and second rings removably attach the bushing to a respective one of the first and second pipes. When the system is assembled the first and second rings have fingers that interlock with each other.

The foregoing and other objects and advantages of these embodiments will be apparent to those of ordinary skill in the art in view of the following detailed description, taken in conjunction with the appended claims and the accompanying drawings.

BRIEF DESCRIPTION OF THE DRAWINGS

So that the manner in which the features and advantages of the embodiments are attained and can be understood in more detail, a more particular description may be had by reference to the embodiments thereof that are illustrated in the appended drawings. However, the drawings illustrate only some embodiments and therefore are not to be considered limiting in scope as there may be other equally effective embodiments.

The use of the same reference symbols in different drawings indicates similar or identical items.

DETAILED DESCRIPTION

Figure 1:
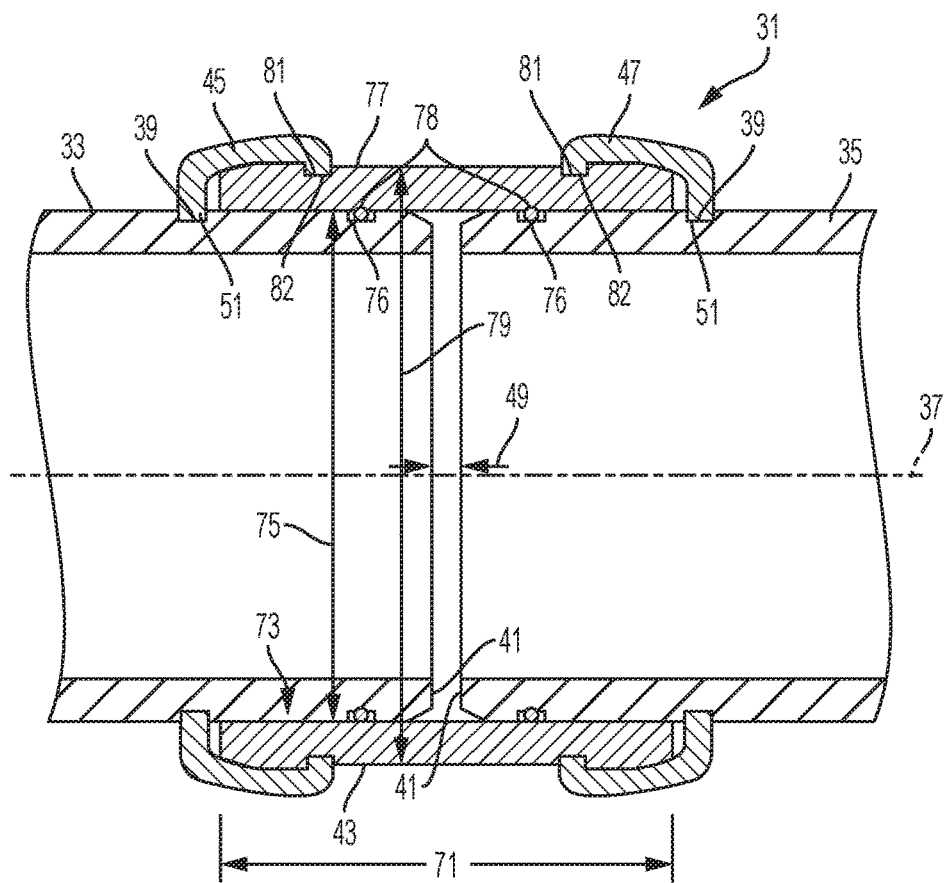
FIG. 1 is a sectional side view of an embodiment of a pipe system.

Embodiments of a system, method, assembly and apparatus for an in-line removable pipe assembly are disclosed. For example, a pipe restraining system 31 (FIGS. 1-4) may include first and second pipes 33, 35, each having an axis 37 and a groove 39 adjacent an axial end 41 thereof. A bushing 43 may be configured to bridge and hydraulically seal with the first and second pipes 33, 35. System 31 also may include first and second clamp rings 45, 47. Each clamp ring 45, 47 may be configured to removably attach the bushing 43 to a respective one of the first and second pipes 33, 35. Each pipe 33, 35 may comprise a seal 78 mounted in a seal groove 76 on the exterior thereof.

When the pipe restraining system 31 is assembled, axial tensile loads passing through the first pipe 33 may be transmitted through the first clamp ring 45, the bushing 43 and the second clamp ring 47 to the second pipe 35. In addition, an axial distance 49 between the first and second pipes 33, 35 can remain substantially constant when system 31 is assembled. Similarly, axial compressive loads passing through the first pipe 33 may be transmitted through the first clamp ring 45, the bushing 43 and the second clamp ring 47 to the second pipe 35.

In some versions, each of the first and second clamp rings 45, 47 comprises a flange 51 that mates with the groove 39 in a respective one of the first and second pipes 33, 35 when assembled. In this example, each of the first and second clamp rings 45, 47 does not comprise a full cylindrical shape.

Figure 6:
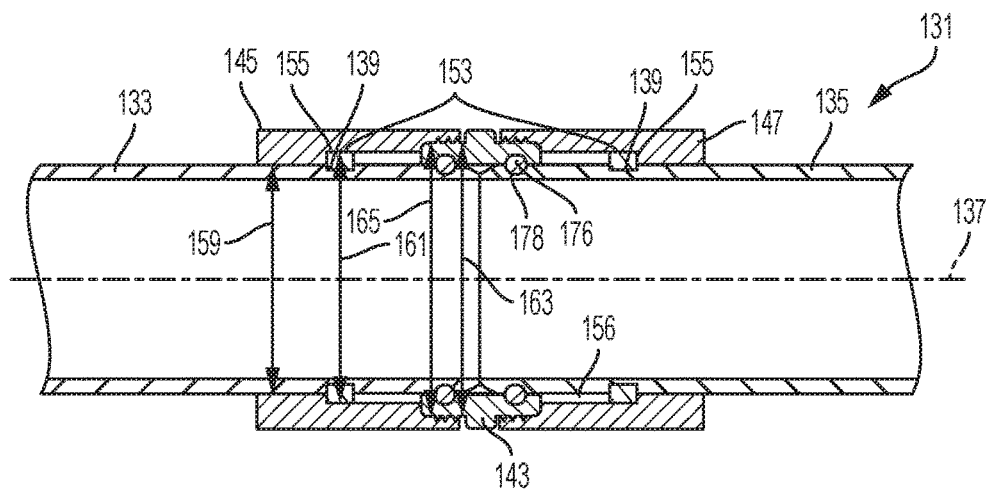
FIGS. 6-8 are sectional side views of another embodiment of a pipe system in a sequence of disassembly steps.
Figure 7:
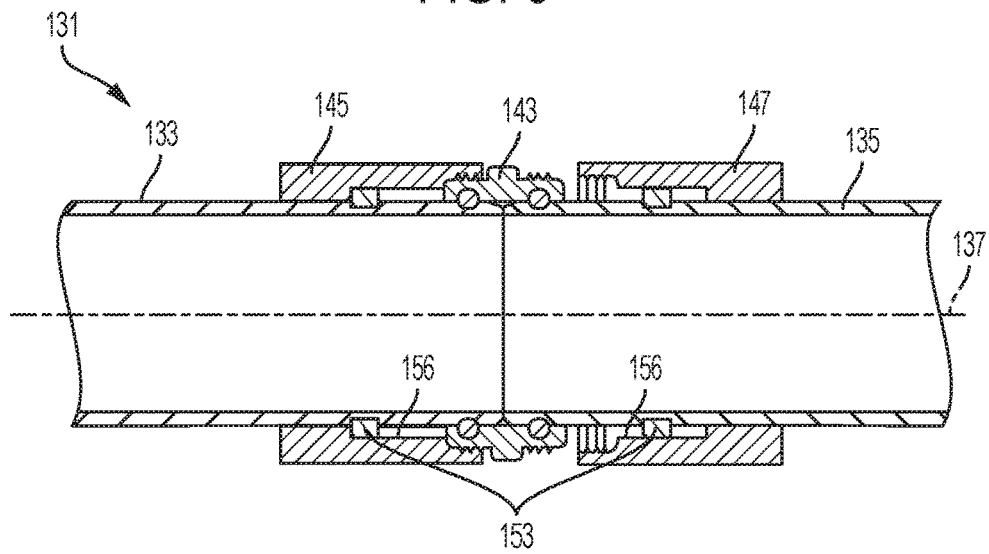
Figure 8:
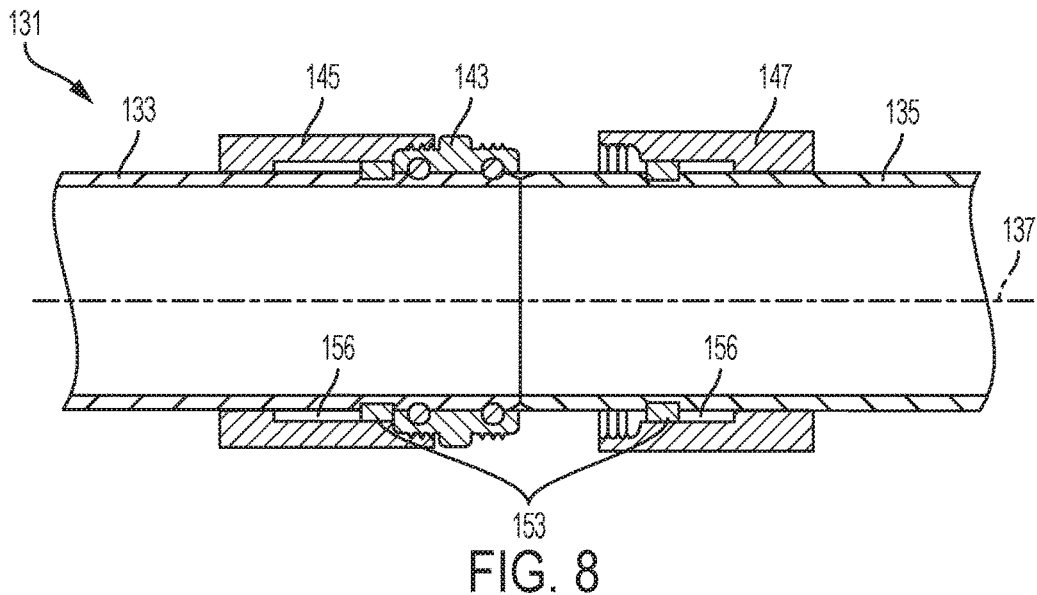
Figure 9:
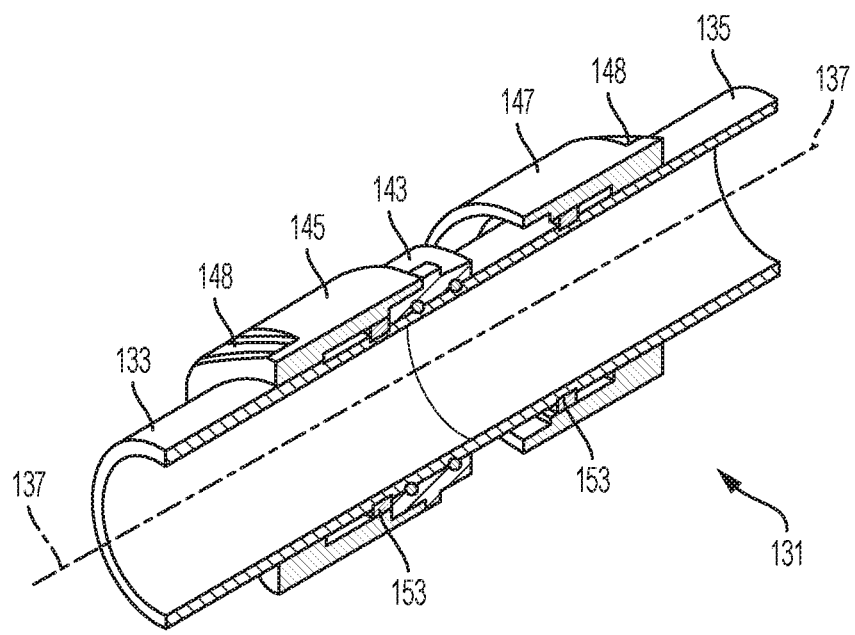
FIG. 9 is an isometric sectional view of the embodiment of FIGS. 6-8.

Each of the pipe restraining systems disclosed herein has a number of advantages. For example, during disassembly of the system 31 and without axially moving the first and second pipes 33, 35, the bushing 43 can axially slide completely over one of the first and second pipes 33, 35 and have no overlap with the other of the first and second pipes 33, 35. In the example of system 131 in FIGS. 6-9, pipes 133, 135 axially abut each other. In FIG. 6, system 131 is completely assembled. In FIG. 7, second clamp ring 147 is uncoupled from bushing 143, which first clamp ring 145 remains connected to bushing 143. Pipes 133, 135 still abut. In FIG. 8, the sub-assembly of bushing 143 and first clamp ring 145 are axially slid to the left so that bushing 143 no longer contacts or overlaps pipe 135. Again, pipes 133, 135 still abut each other. At this stage pipe 135 may be removed from system 131, second clamp ring 147 may be removed from pipe 135 and installed on a new pipe, and the new pipe can be installed in system 131 as pipe 135 once was (like FIG. 6). In this version, the first and second clamp rings 145, 147 are threaded to the bushing 143.

Hinge Lock

Embodiments of a coupling for forming a joint between at least two pipes 33, 35 (FIGS. 1-4) also is disclosed. The coupling may include the bushing 43 having a tubular profile with an axis 37, an axial length 71, a bore 73 with an inner diameter 75, and an exterior 77 with an outer diameter 79. In one example, bushing inner diameter 75 is substantially constant along an entirety of the axial length 71. The bushing outer diameter 79 can be substantially constant along an entirety of the axial length 71, other than the clamp grooves 81 and chamfered axial ends.

The bushing 43 may include clamp grooves 81 on the exterior 77. The bushing 43 may be configured to receive axial ends of pipes 33, 35, as shown. The first and second clamps 45, 47 are each configured to be removably attached to a respective one of the clamp grooves 81 in the bushing 43 and a respective one of the pipes 33, 35. In one version, the bushing 43 is configured to symmetrically straddle the two pipes 33, 35 relative to the axis 37, and the two pipes 33, 35 are configured to be free of contact with each other, as shown. In an example, the pipe clamp grooves 39 may be radially offset from the bushing clamp grooves 81 with respect to the axis 37, such that the pipe clamp grooves 39 are not co-planar with the bushing clamp grooves 81.

Each clamp 45, 47 may include the pipe lip 51 and a bushing lip 82 extending from an interior thereof. The pipe lip 51 may be sized and spaced to cooperatively mate with the pipe groove 39. The bushing lip 82 may be sized and spaced to cooperatively mate with one of the clamp grooves 81 on the bushing 43 to form a rigid pipe assembly.

Figure 2:
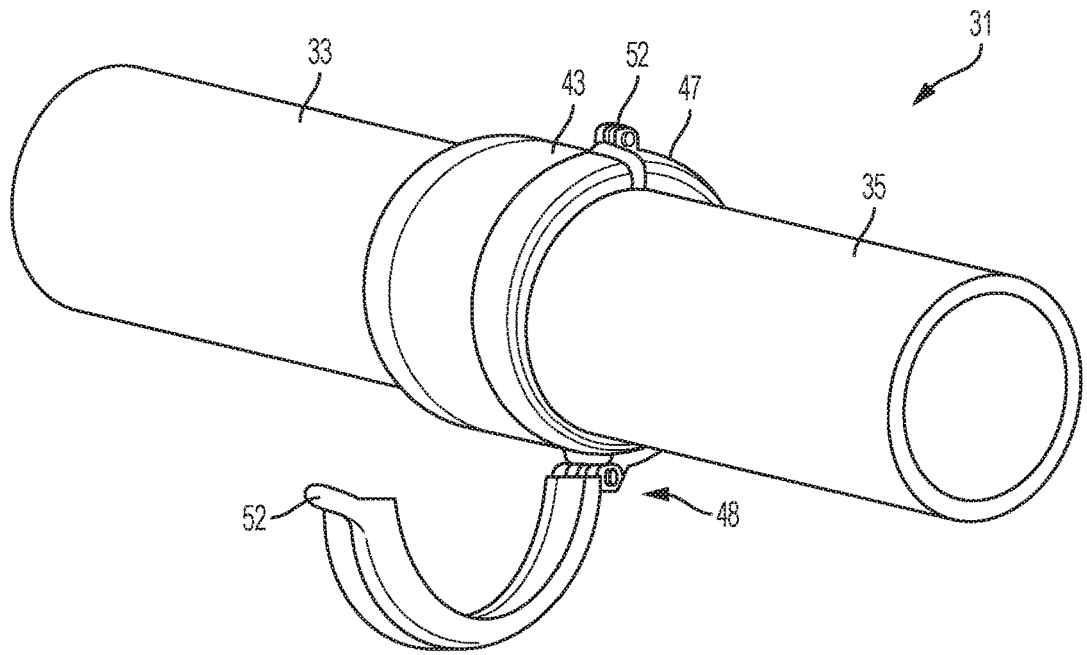
FIG. 2 is an isometric view of the embodiment of FIG. 1 with one clamp open.
Figure 3:
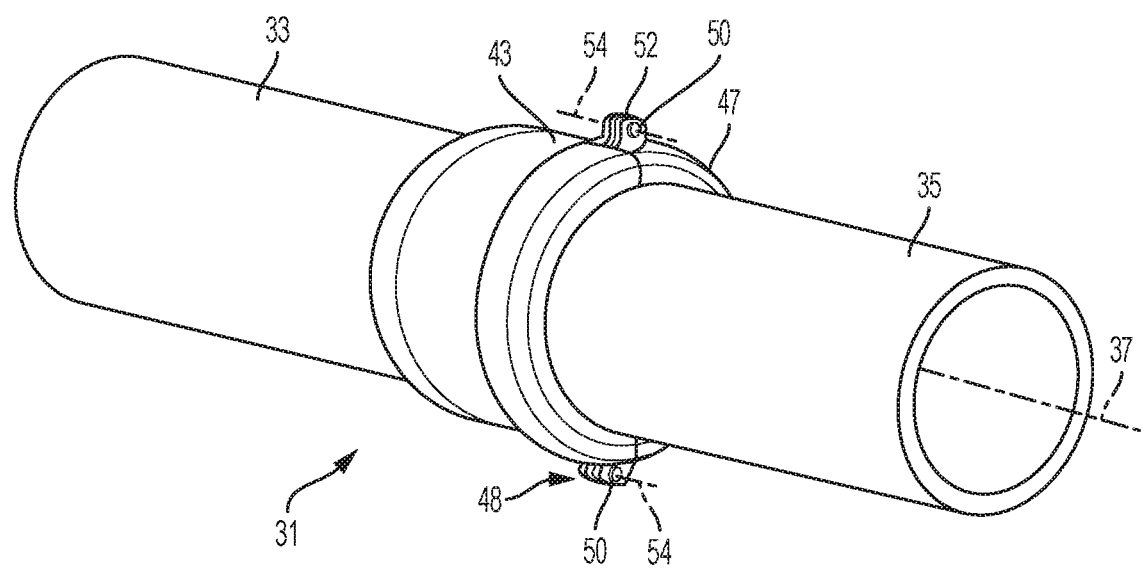
FIG. 3 is an isometric view of the embodiment of FIG. 1 with both clamps closed.
Figure 4:
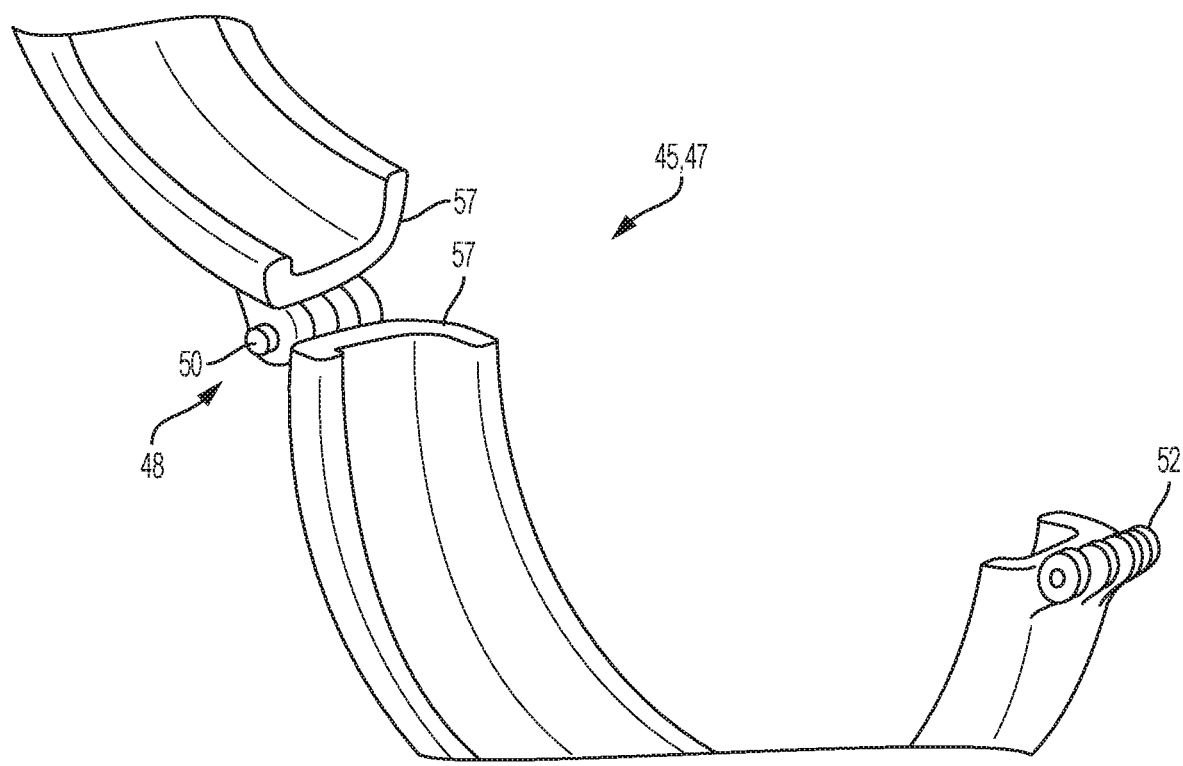
FIG. 4 is an enlarged isometric view of one the clamps in an open position.

As shown in FIGS. 2-4, each clamp 45, 47 may include a hinge 48. Each hinge 48 on each clamp 45, 47 may have a pin 50 that is permanently mounted in the hinge 48. In addition, each clamp 45, 47 may include a clasp 52 configured to be releasably closed. The clasp 52 may comprise a closed configuration (FIG. 3) wherein the pin 50 is located in the clasp 52, and an open configuration (FIGS. 2 and 4) wherein the pin 50 is removed from the clasp 52. In one example, each pin 50 may comprise a polymer. In another example, each pin 50 may comprise at least one of a snap element configured to capture the pin 50, and a radial expansion device configured to expand the pin 50 when installed. In one example, a solid pin 50 may be pushed into a hollow center. The pin 50 can be a cylindrical, or square/rectangular key slid into a keyway formed when the two clamp halves come together. These components may be molded. In one version, every component comprises a polymer (e.g., polyvinylchloride, or PVC), and there are no metal components in the system.

In an example, each pin 50 may include a pin axis 54 (FIG. 3) that is parallel to the pipe and bushing axis 37. Each pin 50 may connect directly to a respective clamp 45, 47 with no additional hardware. In one version, the pins 50 are not threaded.

Each clamp 45, 47 may comprise semi-cylindrical clamp portions, as shown, that are configured to mirror each other and form a complete cylindrical clamp around one of the pipes 33, 35 and the bushing 43 when installed. The semi-cylindrical clamp portions may include cooperating features (e.g., hinge 48, clasp 52, etc.) that snap onto each other when installed. Each clamp 45, 47 may include a generally C-shaped radial sectional profile relative to the axis 37. Each clamp 45, 47 may comprise axial ends, each axial end terminates in an annular profile that is radially inward-extending (e.g., lips 51, 81 in FIG. 1), and the annular profiles are radially offset from each other with respect to the axis 37, such that the annular profiles are not co-planar. Each annular profile can terminate at a flat inner surface (again, see lips 51, 81) that is parallel to the axis 37. In a version, the clamps 45, 47 themselves comprise no seals, such that there are no seals directly between the clamps 45, 47 and respective ones of the pipes 33, 35. In some embodiments, the only seals are configured to be between the bushing 43 and respective ones of the pipes 33, 35. In an example, there are no seals directly between the bushing 43 and the clamps 45, 47.

Embodiments of the bushing 43 may comprise one of a straight coupling, an elbow and a tee. Each clamp 45, 47 may include a tapered profile (see FIG. 1) along the axial direction to reduce drag during pipe installation. An axial center of the bushing 43 may include a tapped hole (not shown) configured for connection to a component, such as a riser or another pipe. The tapped hole may be configured to be plugged when the component is not used, and the component can be a tee or a wye.

Embodiments of the coupling may include an anchor configured to enhance movement of the coupling relative to the pipe 33, 35 using tools. For example, prior to assembly, the grooves 81 may be used as an anchoring point to facilitate relative axial movement between the bushing 43 and one or both pipes 33, 35. The coupling may comprise a hydraulically-sealed interface between the pipes 33, 35 and the clamps 45, 47 to maintain the pipes 33, 35 axially spaced-apart from each other in operation including under fluid pressure, and tensile and compressive loading conditions.

Figure 5A:
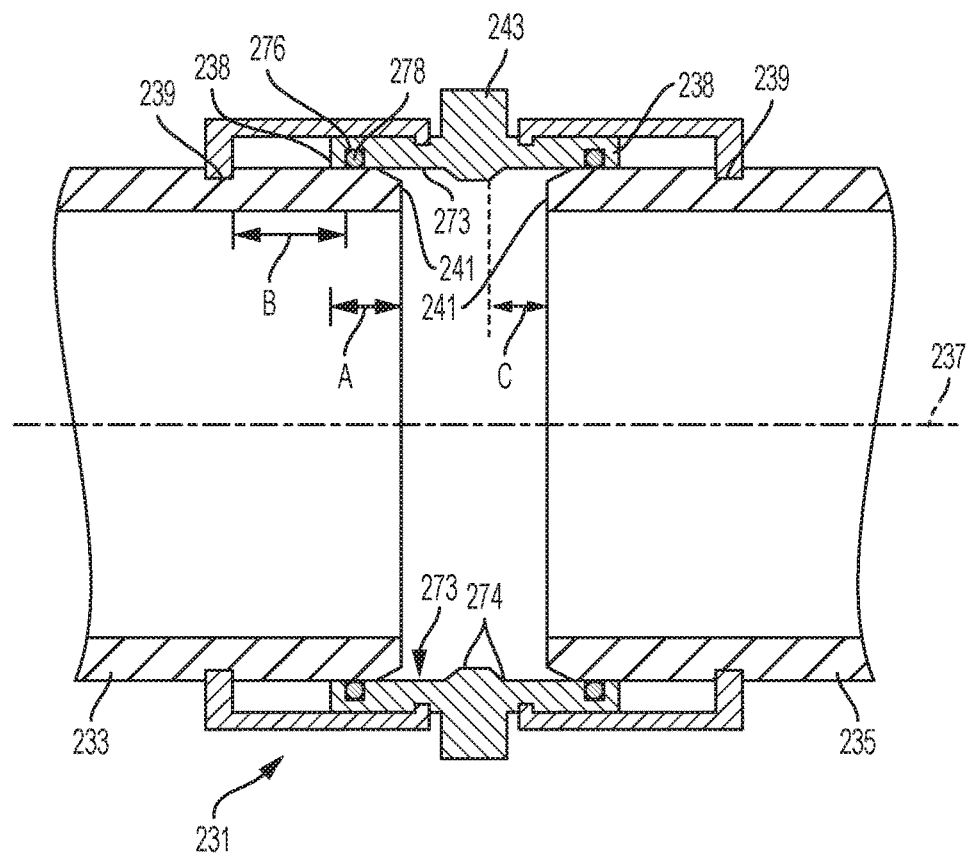
FIGS. 5a and 5b are sectional side views of alternate embodiments of pipe systems.
Figure 5B:
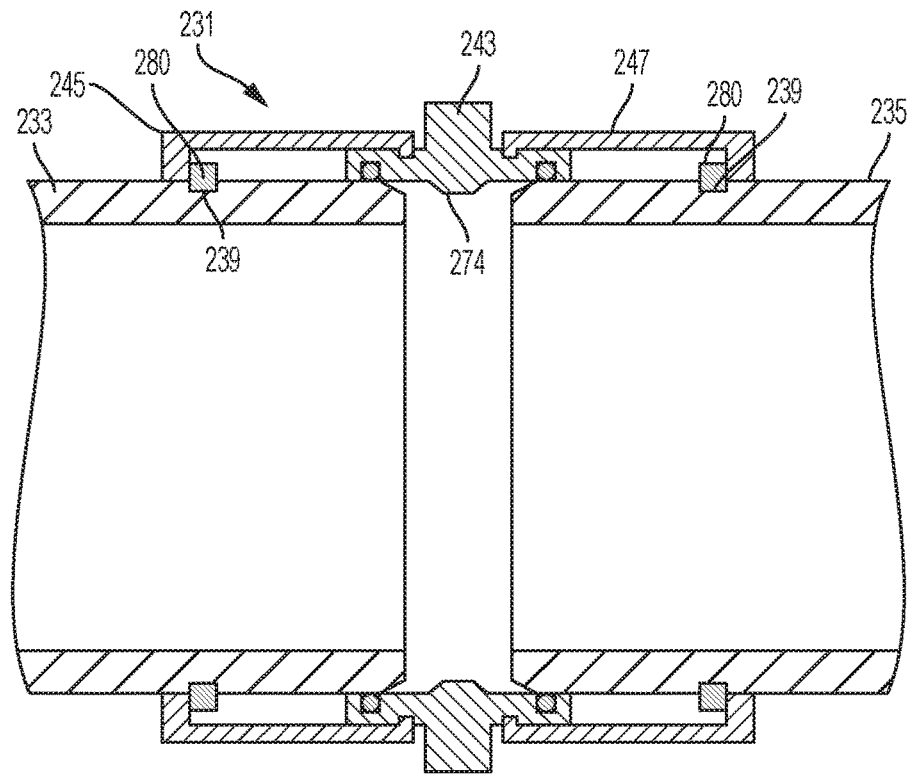

As shown in the embodiment of FIGS. 5a and 5b, the bushing bore 273 may include a shoulder 274 configured to limit axial travel of the pipes 233, 235. The bushing bore 273 may include seal grooves 276 having seals 278 mounted therein. Embodiments of a pipe assembly 231 may include a bushing 243 having a tubular profile with an axis 237, bushing axial ends 238, and a bore 273 with inner seal grooves 276. First and second pipes 233, 235 are mounted in the bore 273 of the bushing 243. Each pipe 233, 235 has a pipe axial end 241 and an outer clamp groove 239.

In some examples, a distance A is defined as an axial overlap distance from one of the bushing axial ends 238 to a respective pipe axial end 241. A distance B is defined as an axial separation distance from one of the bushing inner seal grooves 276 to a respective pipe outer clamp groove 239. In one version, B>A. The bore 273 of the bushing 243 may include a stop 274 for limiting axial travel of the pipes 233, 235. A distance C may be defined as an axial stop distance from the stop 274 to a respective pipe axial end 241. In one version, C>A. In an embodiment, the seal 278 in seal groove 276 does not contact the retaining ring 280 (FIG. 5b) or fall into the retaining groove 239. In an example, the distance C the clearance in the assembled position between the edge 241 of the pipe 233, 235 and the edge of any feature that would come in contact with the pipe 233, 235 during dis-assembly. The gap C may be sufficiently large enough for the coupling to slide back onto one of the pipes 233, 235 and clear the opposite pipe 233, 235. In still other embodiments, system 31 may include a pipe assembly, a method of forming a pipe joint, and/or a method of replacing a component in a pipe system.

Thread Lock

Returning to the embodiments of FIGS. 6-9, system 131 may further include a retaining ring 153 configured to be installed in the groove 139 of a respective one of the first and second pipes 133, 135. The retaining ring 153 may be configured to be captured inside a recess 155 of a respective one of the first and second clamp rings 145, 147. In one example, the retaining ring 153 may comprise a spline. In addition, the bushing 143 may comprise interior seal grooves 176 having seals 178 (e.g., o-rings) mounted therein. Although seals 178 are illustrated as undeflected against pipes 133, 135, they would naturally compress to the exterior shape of the pipes 133, 135.

Examples of each clamp ring 145, 147 may comprise a single component having fully cylindrical shape without a split (e.g., contrast the split 57 (FIG. 4) in rings 45, 47) in the clamp ring 145, 147. In some versions, each clamp ring 145, 147 may include a first inner diameter (ID) 159 (FIG. 6) sized to fit over an outer diameter (OD) of each pipe 133, 135 but not over the OD 161 of the retaining ring 153. Each clamp ring 145, 147 also may include a second ID 163 sized to fit over the OD 165 of the bushing 143.

Versions of the clamp rings 145, 147 may be characterized as nuts with drive flats 148 for attachment of a tool to assist rotating clamp rings 145, 147 about axis 137. The nuts may be configured to be removably attached to the bushing 143 and a respective pipe 133, 135 to form the pipe joint.

Embodiments of the bushing 143 may include an inner diameter that is substantially constant along an entirety of its axial length, other than seal grooves 176. Alternatively, the pipes 133, 135 may comprise the seal grooves rather than the bushing. The pipes 133, 135 may include inner and outer diameters that are substantially constant along their entire axial lengths. As shown in FIGS. 6-8, the outer diameter of the bushing 143 can be substantially radially flush with outer surfaces of the clamp rings 145, 147. In one example, the clamp rings 145, 147 are axially longer than the bushing 143. The retainer rings disclosed herein may comprise split rings or continuous rings. The retainer rings may comprise a molded polymer.

In some versions, each clamp ring 145, 147 may include a spline slot 156 configured to allow the nut to be axially movable along a respective pipe prior to formation of the pipe assembly. In an example, the bushing 143 may be configured to be indirectly axially restrained with respect to the pipes 133, 135 via the clamp rings 145, 147 after formation of the pipe assembly. In another example, the bushing 143 is not configured to be directly axially restrained with respect to the pipes 133, 135 after formation of the pipe assembly. In still another example, and prior to formation of the pipe assembly, the bushing 143 may be unrestrained to freely move axially along outer surfaces of the pipes 133, 135. The bushing 143 and the clamp rings 145, 147 may comprise a polymer, such as PVC.

Embodiments of the bushing 143 may be externally threaded and configured to couple to internal threads in each of the clamp rings 145, 147. In one version, the pipe assembly is configured to be secured only with seals 178, threads and retainer rings 153. In another version, the pipe assembly consists only of the bushing 143, clamp rings 145, 147 and pipes 133, 135, other than seals 178 and retainer rings 153. Examples of the bushing 143 can radially engage and directly axially abut an axially planar surface of each of the clamp rings 145, 147 after formation of the pipe assembly. Versions of the bushing 143 and clamp rings 145, 147 are configured to not be restrained from rotation relative to the pipes 133, 135 after formation of the pipe assembly.

Embodiments of the clamp rings 145, 147 may include a first inner diameter 159 (FIG. 6) for engaging an exterior of a respective pipe 133, 135, a second inner diameter 161 for receiving a portion of a retainer ring 153, and a third inner diameter 163 for engaging the bushing 143. In one example, the first inner diameter 159<the second inner diameter 161<the third inner diameter 163. In another example, the first inner diameter 159 is substantially similar to the inner diameter of the bushing 143, and the second inner diameter 161>the bushing inner diameter. The first inner diameter 159 can be substantially constant along its entire axial length. The second inner diameter 161 can be substantially constant along its entire axial length. The second inner diameter 161 can be located axially between the first inner diameter 159 and the third inner diameter 163. In one example, the first, second and third inner diameters 159, 161, 163 each has a nut segment axial length (NSAL), and the second NSAL>the first NSAL>the third NSAL.

In one version, the pipes 133, 135 substantially axially abut each other after formation of the pipe assembly. In another version, the pipes 133, 135 are free of contact with each other after formation of the pipe assembly.

Figure 10:
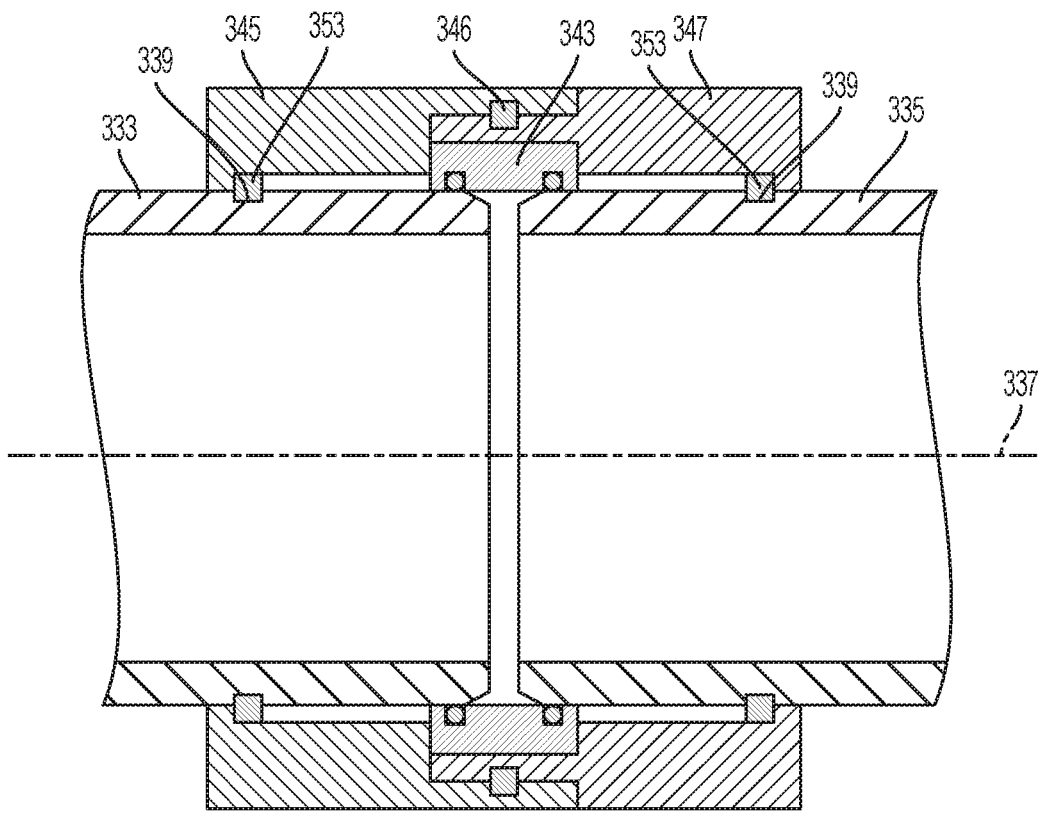
FIG. 10 is a sectional side view of yet another embodiment of a pipe system.
Figure 11A:
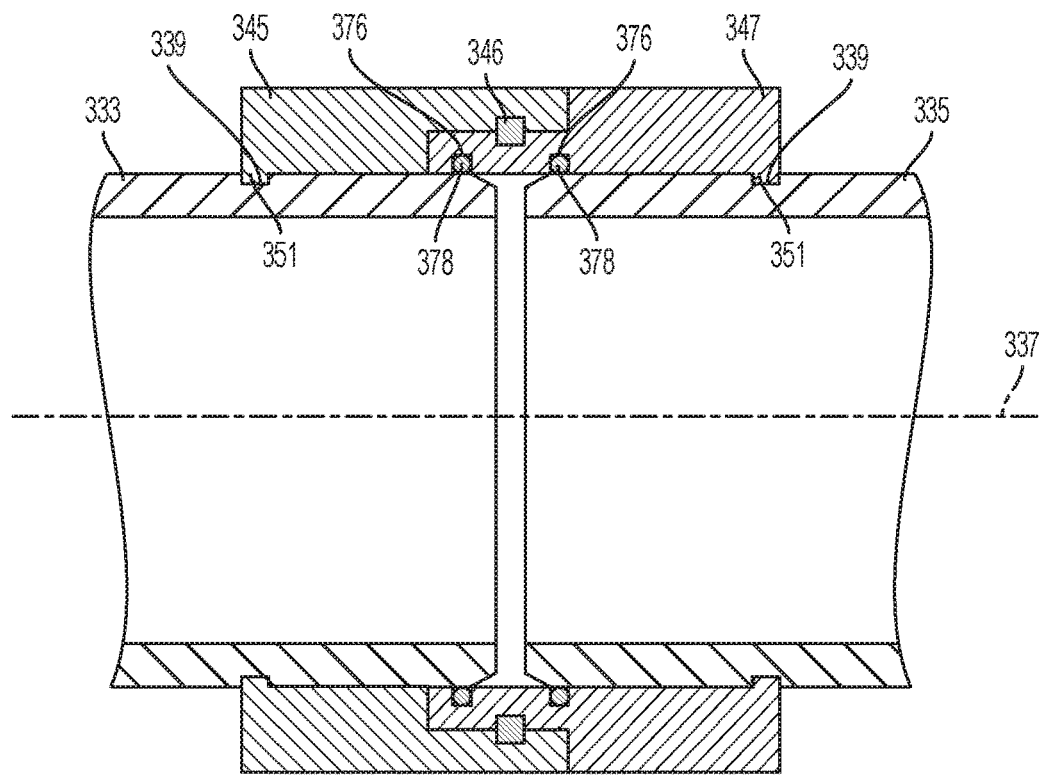
FIGS. 11a and 11b are sectional side views of alternate embodiments of pipe systems.

In some versions (FIGS. 10, 11a and 11b), the first and second clamp rings 345, 347 may directly engage each other. For example, the first and second clamp rings 345, 347 may coaxially (along axis 337) thread to each other. One of the clamp rings 345, 347 may overlap the other relative to the axis 337. The system 311 may further include a retainer ring 346 (e.g., a spline) configured to complete the assembly. In an example, the retainer ring 346 can couple the clamp rings 345, 347 to each other (FIG. 10). In one version, the retainer ring 346 may be used to attach the first and second clamp rings 345, 347 to the bushing 343. In the example of FIG. 10, only one of the first and second rings 345, 347 contacts the exterior of the bushing 343.

In another example, the retainer ring 346 (FIGS. 11a and 11b) couples clamp rings 345, 347 to each other, and no bushing is used. Rather, seal grooves 376 and seals 378 can be in at least one of the clamp rings 345, 347. In addition, some examples of the embodiments of FIGS. 11a and 11b have no threads, such that clamp rings 345, 347 are secured to each other only with retainer ring 346.

Figure 11B:
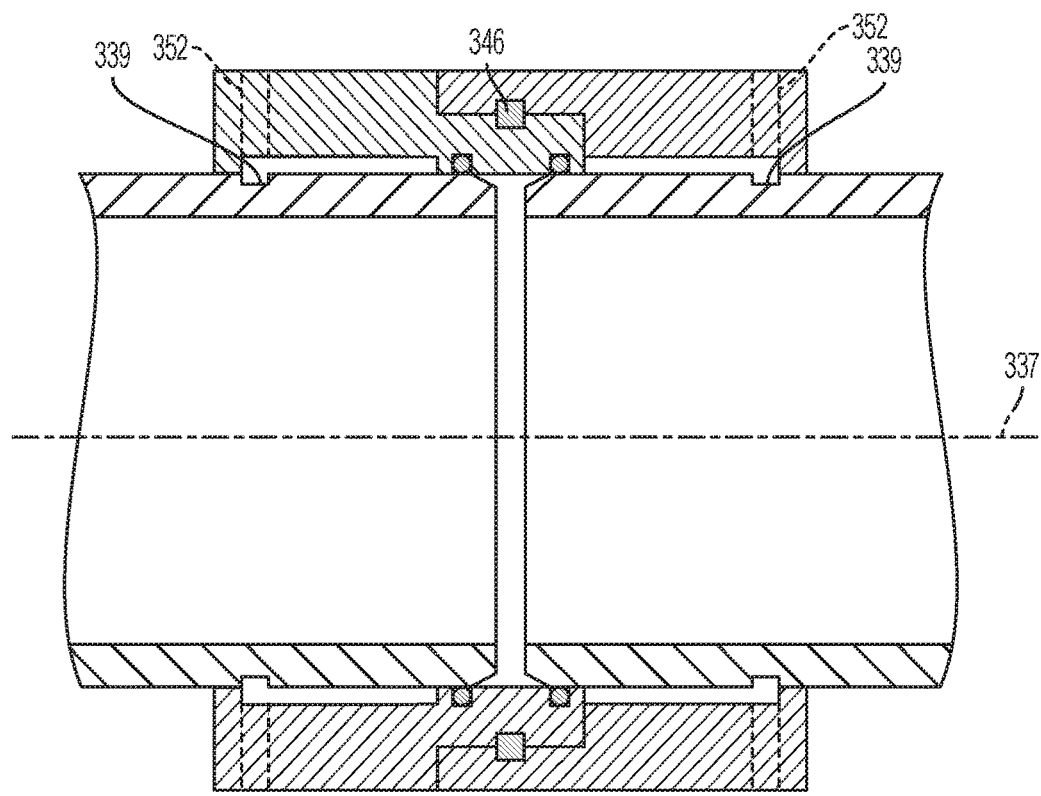
Figure 12:
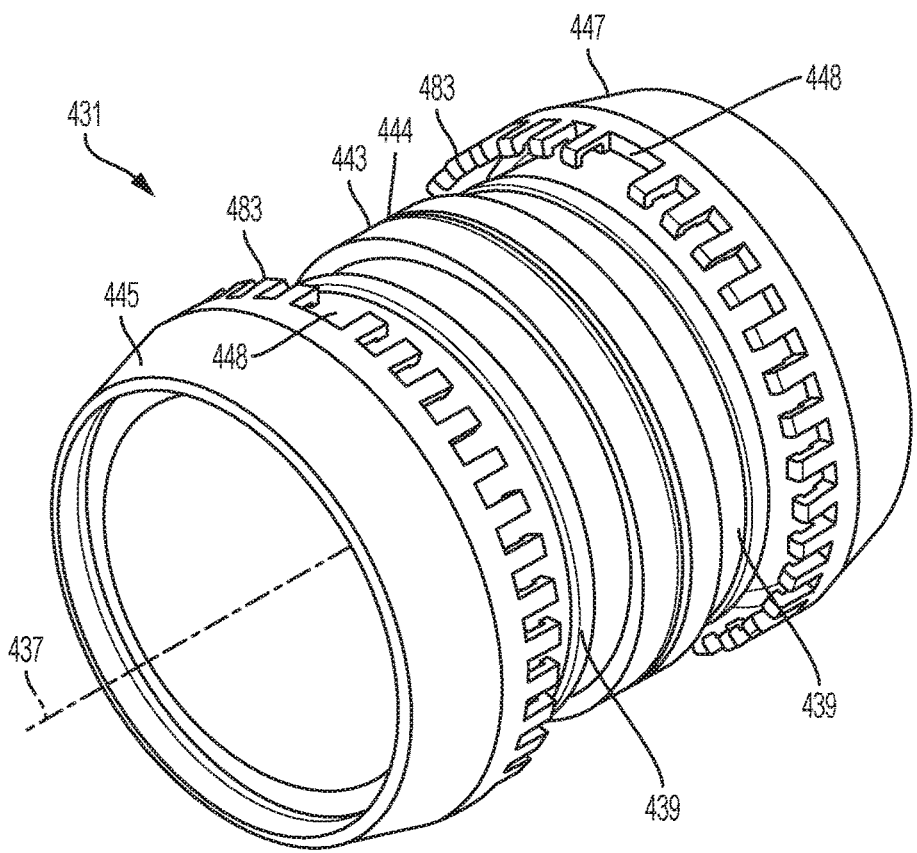
FIG. 12 is an isometric view of an embodiment of a pipe system shown partially disassembled.

In the embodiments of FIGS. 10 and 11b, pipes 333, 335 have ring grooves 339 that receive retainer rings 353 for securing the assembly. In the FIG. 11b version, clamp rings 345, 347 have apertures 352 through which retainer rings 353 (FIG. 10) may be installed to secure the assembly. An analogous aperture may be provided for retainer ring 346. Also, in FIG. 11a, clamp rings 345, 346 have inner lips 351 that mount directly in ring grooves 339 in pipes 333, 335. This design eliminates the need for the additional retainer rings. Other examples may include a pipe system, a method of forming a pipe joint and a method of replacing a component in a pipe system.

Finger Lock

Figure 13:
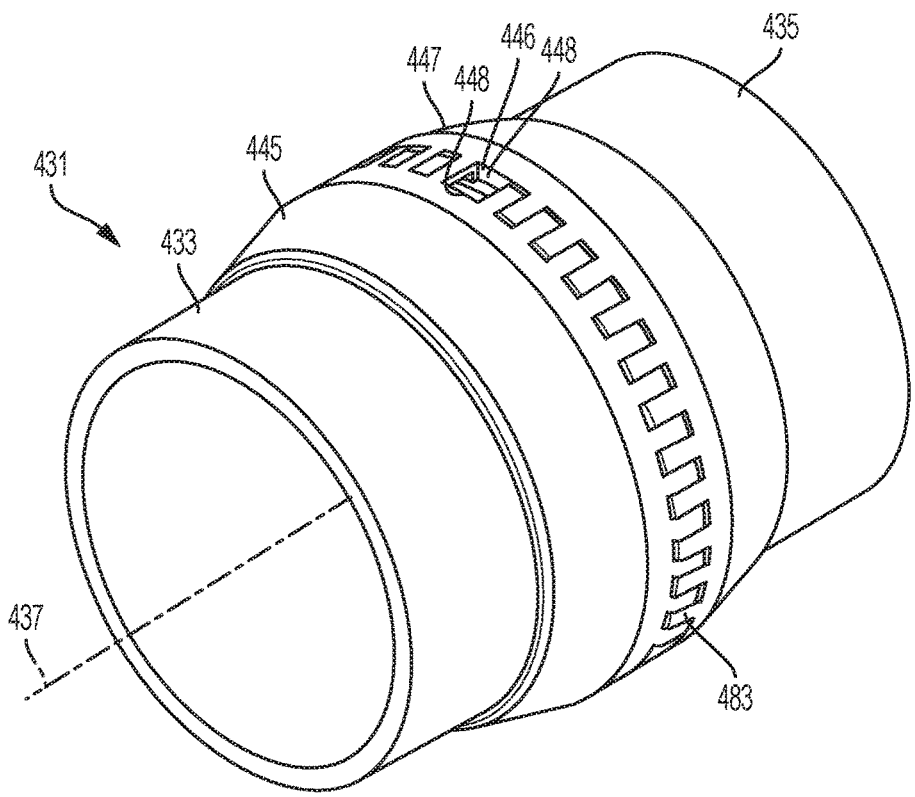
FIG. 13 is an isometric view of the embodiment of FIG. 12 assembled.
Figure 14:
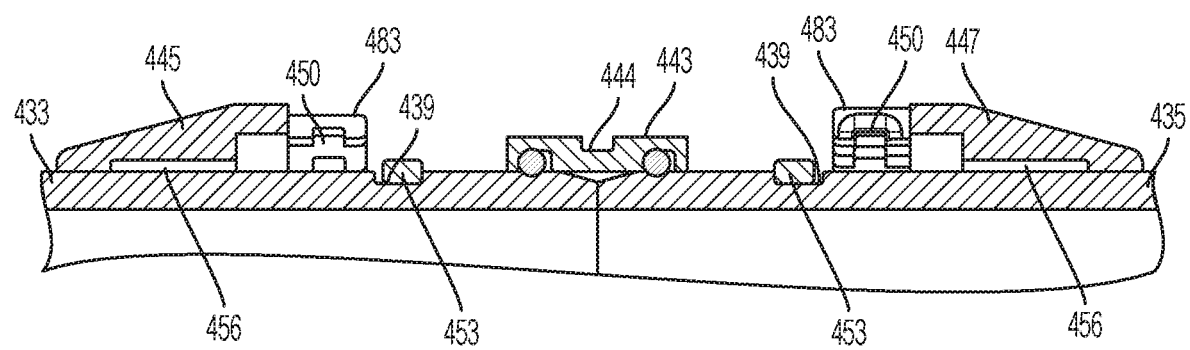
FIG. 14 is a sectional side view of the embodiment of FIG. 12 shown partially disassembled.
Figure 15:
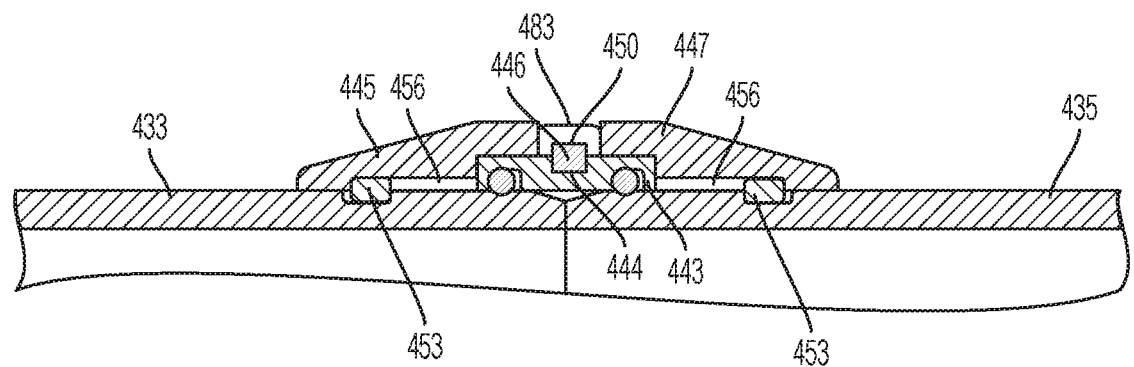
FIG. 15 is a sectional side view of the embodiment of FIG. 13 assembled.

In still other versions (FIGS. 12-15), a system 431 may include clamp rings 445, 447 having fingers 483 that are configured to interlock. In one example, the fingers 483 comprise castellations. The fingers 483 can be rectilinear in shape and configured to be parallel to other ones of the fingers 483 when engaged. The interlocking fingers 483 may be configured to accept a retainer ring 446 through apertures 448, such that the retainer ring 446 also engages with a groove 444 in the bushing 443 and grooves 450 in inner surfaces of the fingers 483. In an example, apertures 448 are in communication with the grooves 444, 450 and configured for providing ingress and egress thereto. When the system 431 is assembled (FIG. 13), the apertures 448 may collectively form a single, unitary access hole for the system 431. The retainer ring 446 can be axially centralized on at least one of the bushing 443 and the clamp rings 445, 447.

In a system 431 for restraining pipes 433, 455 with grooves 439 adjacent their axial ends, the bushing 443 is configured to bridge and hydraulically seal with the pipes 433, 435. Each of the clamp rings 445, 447 is configured to removably attach the bushing 443 to a respective one of the pipes 433, 435. When the system 431 is assembled the fingers 483 of the clamp rings 445, 447 interlock with each other. Retaining rings 453 in pipe grooves 439 may be captured inside recesses 456 of the clamp rings 445, 447.

Embodiments of the system may include pipes 433, 435 with axes 437 and grooves 439 adjacent axial ends thereof. The clamp rings 445, 447 may be configured to be removably attached to a respective one of the pipes 433, 435 with the retaining rings 453. When the system 431 is assembled, fingers 483 on the clamp rings 445, 447 interlock with each other.

Other versions may include one or more of the following embodiments:

Embodiment 1

A pipe restraining system, comprising:
first and second pipes, each having an axis and a groove adjacent an axial end thereof;
a bushing configured to bridge and hydraulically seal with the first and second pipes; and
first and second clamp rings, each configured to removably attach the bushing to a respective one of the first and second pipes, such that when the pipe restraining system is assembled, axial tensile loads passing through the first pipe are transmitted through the first clamp ring, the bushing and the second clamp ring to the second pipe, and an axial distance between the first and second pipes remains substantially constant.

Embodiment 2

The pipe restraining system of any of these embodiments, wherein during disassembly of the pipe restraining system and without axially moving the first and second pipes, the bushing is configured to axially slide completely over one of the first and second pipes and have no overlap with the other of the first and second pipes.

Embodiment 3

The pipe restraining system of any of these embodiments, wherein each of the first and second clamp rings comprises a flange that mates with the groove in a respective one of the first and second pipes when assembled.

Embodiment 4

The system of any of these embodiments, further comprising a retaining ring configured to be installed in the groove of a respective one of the first and second pipes, and the retaining ring is configured to be captured inside a recess of a respective one of the first and second clamp rings.

Embodiment 5

The system of any of these embodiments, wherein the retaining ring comprises a spline.

Embodiment 6

The system of any of these embodiments, wherein each clamp ring is fully cylindrical without a split in the clamp ring, and each clamp ring comprises a first inner diameter (ID) sized to fit over an outer diameter (OD) of each pipe but not over the OD of the retaining ring, and a second ID sized to fit over the OD of the bushing.

Embodiment 7

The system of any of these embodiments, further comprising a spline configured to attach the first and second clamp rings to the bushing.

Embodiment 8

The system of any of these embodiments, wherein the first and second clamp rings thread to each other or to the bushing.

Embodiment 9

The system of any of these embodiments, wherein the first and second clamp rings comprise fingers that are configured to interlock.

Embodiment 10

The system of any of these embodiments, wherein the interlocking fingers are configured to accept and engage a spline with the bushing.

Embodiment 11

The system of any of these embodiments, wherein each of the first and second clamp rings does not comprise a full cylindrical shape.

Embodiment 12

The system of any of these embodiments, wherein axial compressive loads passing through the first pipe are transmitted through the first clamp ring, the bushing and the second clamp ring to the second pipe.

Embodiment 13

A coupling for forming a joint between at least two pipes, the coupling comprising:
a bushing having a tubular profile with an axis, an axial length, a bore with an inner diameter, an exterior with an outer diameter, clamp grooves on an exterior of the bushing, and the bushing is configured to receive axial ends of pipes; and
first and second clamps, each configured to be removably attached to a respective one of the clamp grooves in the bushing and a respective one of the pipes.

Embodiment 14

The coupling of any of these embodiments, wherein the bushing is configured to symmetrically straddle two pipes relative to the axis, and the two pipes are configured to be free of contact with each other.

Embodiment 15

The coupling of any of these embodiments, wherein the bushing inner diameter is substantially constant along an entirety of the axial length.

Embodiment 16

The coupling of any of these embodiments, wherein the bushing bore comprises a shoulder configured to limit axial travel of the pipes.

Embodiment 17

The coupling of any of these embodiments, wherein the bushing bore comprises seal grooves.

Embodiment 18

The coupling of any of these embodiments, wherein the bushing bore comprises seals mounted in the seal grooves.

Embodiment 19

The coupling of any of these embodiments, wherein the bushing outer diameter is substantially constant along an entirety of the axial length.

Embodiment 20

The coupling of any of these embodiments, wherein each pipe is configured to comprise a seal groove on the exterior thereof.

Embodiment 21

The coupling of any of these embodiments, wherein each pipe is configured to comprise a seal mounted in the seal groove on the exterior thereof.

Embodiment 22

The coupling of any of these embodiments, wherein each pipe is configured to comprise a clamp groove on an exterior thereof.

Embodiment 23

The coupling of any of these embodiments, wherein the pipe clamp grooves are radially offset from the bushing clamp grooves with respect to the axis, such that the pipe clamp grooves are not co-planar with the bushing clamp grooves.

Embodiment 24

The coupling of any of these embodiments, wherein each pipe is configured to comprise a seal groove on an exterior thereof.

Embodiment 25

The coupling of any of these embodiments, wherein each clamp comprises a hinge.

Embodiment 26

The coupling of any of these embodiments, wherein the hinge on each clamp comprises a pin that is permanently mounted in the hinge.

Embodiment 27

The coupling of any of these embodiments, wherein each clamp comprises a clasp configured to be releasably closed.

Embodiment 28

The coupling of any of these embodiments, wherein the clasp comprises a closed configuration wherein the pin is located in the clasp, and an open configuration wherein the pin is removed from the clasp.

Embodiment 29

The coupling of any of these embodiments, wherein each pin comprises a polymer.

Embodiment 30

The coupling of any of these embodiments, wherein each pin comprises at least one of a snap element configured to capture the pin, and a radial expansion device configured to expand the pin when installed.

Embodiment 31

The coupling of any of these embodiments, wherein each clamp has a pipe lip and a bushing lip extending from an interior thereof, the pipe lip is sized and spaced to cooperatively mate with a pipe groove, and the bushing lip is sized and spaced to cooperatively mate with one of the clamp grooves on the bushing to form a rigid pipe assembly.

Embodiment 32

The coupling of any of these embodiments, wherein each clamp comprises semi-cylindrical clamp portions that are configured to mirror each other and form a complete cylindrical clamp around one of the pipes and the bushing when installed.

Embodiment 33

The coupling of any of these embodiments, wherein the semi-cylindrical clamp portions comprise cooperating features that snap onto each other when installed.

Embodiment 34

The coupling of any of these embodiments, wherein the semi-cylindrical clamp portions comprise features configured to form a hinge when mated together.

Embodiment 35

The coupling of any of these embodiments, wherein the features comprise at least one of a snap element configured to capture a pin, and a radial expansion device configured to expand the pin when installed.

Embodiment 36

The coupling of any of these embodiments, wherein each pin has a pin axis that is parallel to the bushing axis.

Embodiment 37

The coupling of any of these embodiments, wherein each pin connects directly to a respective clamp with no additional hardware.

Embodiment 38

The coupling of any of these embodiments, wherein the pins are not threaded.

Embodiment 39

The coupling of any of these embodiments, wherein each of the bushing, clamps, hinges, clamps and pins comprise a polymer.

Embodiment 40

The coupling of any of these embodiments, wherein the polymer comprise polyvinylchloride (PVC).

Embodiment 41

The coupling of any of these embodiments, wherein each clamp has a generally C-shaped radial sectional profile relative to the axis.

Embodiment 42

The coupling of any of these embodiments, wherein each clamp has axial ends, each axial end terminates in an annular profile that is radially inward-extending, and the annular profiles are radially offset from each other with respect to the axis, such that the annular profiles are not co-planar.

Embodiment 43

The coupling of any of these embodiments, wherein each annular profile terminates at a flat inner surface that is parallel to the axis.

Embodiment 44

The coupling of any of these embodiments, wherein the clamps comprise no seals.

Embodiment 45

The coupling of any of these embodiments, wherein the only seals are configured to be between the bushing and respective ones of the pipes.

Embodiment 46

The coupling of any of these embodiments, wherein there are no seals configured to be directly between the bushing and clamps.

Embodiment 47

The coupling of any of these embodiments, wherein there are no seals configured to be directly between the clamps and respective ones of the pipes.

Embodiment 48

The coupling of any of these embodiments, wherein the bushing comprises one of a straight coupling, an elbow and a tee.

Embodiment 49

The coupling of any of these embodiments, wherein each clamp comprises a tapered profile to reduce drag during pipe installation.

Embodiment 50

The coupling of any of these embodiments, wherein an axial center of the bushing comprises a tapped hole configured for connection to a component.

Embodiment 51

The coupling of any of these embodiments, wherein the tapped hole is configured to be plugged when the component is not used, and the component comprises a tee or a wye.

Embodiment 52

The coupling of any of these embodiments, wherein the coupling comprises an anchor configured to enhance movement of the coupling relative to the pipe using tools.

Embodiment 53

The coupling of any of these embodiments, wherein the coupling is configured to comprise a hydraulically-sealed interface between the pipes and the clamps are configured to maintain the pipes axially spaced-apart from each other in operation including under fluid pressure, and tensile and compressive loading conditions.

Embodiment 54

The coupling of any of these embodiments, further comprising elastomeric seals configured to provide a fluid tight seal between the bushing and the pipes.

Embodiment 55

The coupling of any of these embodiments, wherein when the pipes are assembled with the coupling, tensile loads applied axially are transferred through the clamps to the pipes.

Embodiment 56

The coupling of any of these embodiments, wherein when the pipes are assembled, tensile loads applied that would pull an unrestrained assembly apart are supported by the clamps to maintain integrity of the bushing and pipes assembly.

Embodiment 57

The coupling of any of these embodiments, wherein when the pipes are assembled, compression loads on the pipes are transferred through the clamps and bushing.

Embodiment 58

A coupling for forming a joint between at least two pipes, each of the pipes having a clamp groove, the coupling comprising:
a bushing having a tubular profile with an axis, an axial length, a bore with an inner diameter, an exterior with an outer diameter, and the bushing is configured to receive axial ends of pipes; and
first and second clamps, each configured to be removably attached to the bushing and to a respective one of the clamp grooves in a respective one of the pipes.

Embodiment 59

A coupling for forming a joint between at least two pipes, the coupling comprising:
a bushing having a tubular profile with an axis, an axial length, a bore with an inner diameter, an exterior with an outer diameter, and the bushing is configured to receive axial ends of pipes; and
first and second clamps, each configured to be removably attached to the bushing and to a respective pipe, each clamp having axial ends, each axial end terminates in an annular profile that is radially inward-extending, and the annular profiles are radially offset from each other with respect to the axis, such that the annular profiles are not co-planar.

Embodiment 60

A coupling for forming a joint between at least two pipes, the coupling comprising:
a bushing having a tubular profile with an axis, an axial length, axial ends, a bore with an inner diameter, an exterior with an outer diameter, and each axial end of the bushing is configured to receive a pipe axial end;
first and second clamps, each configured to be removably attached over a respective axial end of the bushing and to a respective pipe, each clamp covers one axial end of the bushing, and the clamps comprise no clamp seals; and
the coupling comprises no metal components.

Embodiment 61

A pipe assembly, comprising:
a bushing having a tubular profile with an axis, bushing axial ends, and a bore with inner seal grooves;
first and second pipes mounted in the bore of the bushing, each pipe having a pipe axial end and an outer clamp groove;
a distance A is defined as an axial overlap distance from one of the bushing axial ends to a respective pipe axial end; and
a distance B is defined as an axial separation distance from one of the bushing inner seal grooves to a respective pipe outer clamp groove, and B>A.

Embodiment 62

The pipe assembly of any of these embodiments, wherein the bore of the bushing comprises a stop for limiting axial travel of the pipes, a distance C is defined as an axial stop distance from the stop to a respective pipe axial end, and C>A.

Embodiment 63

A coupling for forming a joint between two pipes, the coupling comprising:
a bushing having a tubular profile with an axis, an axial length, an exterior, a bore with an inner diameter, and the bushing is configured to receive axial ends of the pipes; and
first and second nuts, each configured to be removably attached to the bushing and a respective pipe to form the joint.

Embodiment 64

The coupling of any of these embodiments, wherein the bushing inner diameter is substantially constant along an entirety of the axial length.

Embodiment 65

The coupling of any of these embodiments, wherein the bushing bore comprises seal grooves, each configured to retain a seal for each of the pipes.

Embodiment 66

The coupling of any of these embodiments, wherein each pipe comprises a seal groove configured to retain a seal for the bushing.

Embodiment 67

The coupling of any of these embodiments, wherein the pipes have inner and outer diameters configured to be substantially constant along entire axial lengths thereof.

Embodiment 68

The coupling of any of these embodiments, wherein the bushing has an outer diameter that is configured to be substantially radially flush with outer surfaces of the nuts.

Embodiment 69

The coupling of any of these embodiments, wherein the bushing outer diameter comprises a bushing OD axial length, and each of the nuts comprise a nut outer diameter (OD) axial length that is greater than the bushing OD axial length.

Embodiment 70

The coupling of any of these embodiments, wherein each pipe has a spline groove configured to retain a spline.

Embodiment 71

The coupling of any of these embodiments, wherein each spline is a split ring or a continuous ring.

Embodiment 72

The coupling of any of these embodiments, wherein each spline is a molded polymer.

Embodiment 73

The coupling of any of these embodiments, wherein each nut comprises a spline slot configured to allow the nut to be axially movable along a respective pipe prior to formation of the pipe assembly.

Embodiment 74

The coupling of any of these embodiments, wherein the bushing is configured to be indirectly axially restrained with respect to the pipes via the nuts after formation of the pipe assembly.

Embodiment 75

The coupling of any of these embodiments, wherein the bushing is not configured to be directly axially restrained with respect to the pipes after formation of the pipe assembly.

Embodiment 76

The coupling of any of these embodiments, wherein, prior to formation of the pipe assembly, the bushing is unrestrained to freely move axially along outer surfaces of the pipes.

Embodiment 77

The coupling of any of these embodiments, wherein the bushing and the nuts comprise a polymer.

Embodiment 78

The coupling of any of these embodiments, wherein the polymer comprise polyvinylchloride (PVC).

Embodiment 79

The coupling of any of these embodiments, wherein there are no seals configured to be directly between the bushing and the nuts.

Embodiment 80

The coupling of any of these embodiments, wherein there are no seals configured to be directly between the nuts and the pipes.

Embodiment 81

The coupling of any of these embodiments, wherein there are no seals that directly contact the nuts.

Embodiment 82

The coupling of any of these embodiments, wherein the only seals of the pipe assembly are configured to be between the bushing and the pipes.

Embodiment 83

The coupling of any of these embodiments, wherein the bushing is externally threaded and configured to couple to internal threads in each of the nuts.

Embodiment 84

The coupling of any of these embodiments, wherein the pipe assembly is configured to be secured only with seals, threads and splines.

Embodiment 85

The coupling of any of these embodiments, wherein the pipe assembly is configured to consist of only the bushing, nuts and pipes, other than seals and splines.

Embodiment 86

The coupling of any of these embodiments, wherein the bushing is configured to radially engage and directly axially abut an axially planar surface of each of the nuts after formation of the pipe assembly.

Embodiment 87

The coupling of any of these embodiments, wherein the bushing and nuts are configured to not be restrained from rotation relative to the pipes after formation of the pipe assembly.

Embodiment 88

The coupling of any of these embodiments, wherein each nut comprises a first inner diameter for engaging an exterior of a respective pipe, a second inner diameter for receiving a portion of a spline, and a third inner diameter for engaging the bushing.

Embodiment 89

The coupling of any of these embodiments, wherein the first inner diameter<the second inner diameter<the third inner diameter.

Embodiment 90

The coupling of any of these embodiments, wherein the first inner diameter is substantially similar to the bushing inner diameter, and the second inner diameter>the bushing inner diameter.

Embodiment 91

The coupling of any of these embodiments, wherein the first inner diameter is substantially constant along an entire axial length thereof.

Embodiment 92

The coupling of any of these embodiments, wherein the second inner diameter is substantially constant along an entire axial length thereof.

Embodiment 93

The coupling of any of these embodiments, wherein the second inner diameter is located axially between the first inner diameter and the third inner diameter.

Embodiment 94

The coupling of any of these embodiments, wherein the first, second and third inner diameters each has a nut segment axial length (NSAL), and the second NSAL>the first NSAL>the third NSAL.

Embodiment 95

The coupling of any of these embodiments, wherein the nuts comprise a nut outer diameter that is substantially constant along an entire axial length thereof, other than tool engagement flats.

Embodiment 96

The coupling of any of these embodiments, wherein the two pipes are configured to substantially axially abut each other after formation of the pipe assembly.

Embodiment 97

The coupling of any of these embodiments, wherein the two pipes are configured to be free of contact with each other after formation of the pipe assembly.

Embodiment 98

A system for forming a joint between two pipes, the coupling comprising:
a bushing having a tubular profile with an axis, an exterior, a bore with an inner diameter, and the bore is configured to receive axial ends of the pipes; and
first and second rings, wherein only one of the first and second rings is configured to contact the exterior of the bushing, and the first and second rings are configured to be removably attached to each other and to the pipes to form the joint.

Embodiment 99

The system of any of these embodiments, further comprising retaining rings configured to couple the first and second rings to each other and to the pipes.

Embodiment 100

The system of any of these embodiments, wherein the retaining rings comprise splines.

Embodiment 101

A system for forming a joint between two pipes, the coupling comprising:
first and second rings, each having a tubular profile with an axis, each of the first and second rings is configured to receive an axial end of a respective one of the pipes, and one of the first and second rings is configured to overlap the other of the first and second rings relative to the axis; and
the first and second rings are configured to be removably attached to each other and to the pipes with retaining rings to form the joint.

Embodiment 102

The system of any of these embodiments, wherein the retaining rings comprise splines.

Embodiment 103

A system for restraining pipes, comprising:
first and second pipes, each having an axis and a groove adjacent an axial end thereof;
a bushing configured to bridge and hydraulically seal with the first and second pipes; and
first and second rings, each configured to removably attach the bushing to a respective one of the first and second pipes, and when the system is assembled the first and second rings have fingers that interlock with each other.

Embodiment 104

The system of any of these embodiments, further comprising a retaining ring configured to be installed in the groove of a respective one of the first and second pipes, and the retaining ring is configured to be captured inside a recess of a respective one of the first and second rings.

Embodiment 105

The system of any of these embodiments, wherein the retaining ring comprises a spline.

Embodiment 106

The system of any of these embodiments, further comprising a retaining ring configured to secure the first and second rings to at least one of each other and the bushing.

Embodiment 107

The system of any of these embodiments, wherein the retaining ring is axially centralized on at least one of the bushing and the first and second rings.

Embodiment 108

The system of any of these embodiments, wherein each of the interlocking fingers is rectilinear in shape and configured to be parallel to other ones of the interlocking fingers when engaged.

Embodiment 109

The system of any of these embodiments, wherein the interlocking fingers are configured to accept and engage a retaining ring.

Embodiment 110

The system of any of these embodiments, wherein each of the fingers comprises a finger spline groove, the bushing comprises a bushing spline groove, and the retaining ring comprises a spline configured to be located in the finger spline grooves and bushing spline groove.

Embodiment 111

The system of any of these embodiments, wherein each of the first and second rings further comprises a spline access hole in communication with the finger spline grooves and configured for spline ingress and egress.

Embodiment 112

The system of any of these embodiments, wherein, when the system is assembled, the spline access holes collectively form a single, unitary spline access hole for the system.

Embodiment 113

A system for restraining pipes, comprising:
first and second pipes, each having an axis and a groove adjacent an axial end thereof;
a bushing configured to bridge and hydraulically seal with the first and second pipes;
first and second rings, each configured to removably attach the bushing to a respective one of the first and second pipes; and
a retaining ring configured to secure the first and second rings to at least one of each other and the bushing.

Embodiment 114

The system of any of these embodiments, wherein, when the system is assembled, the first and second rings have fingers that interlock with each other.

Embodiment 115

The system of any of these embodiments, wherein the retaining ring is axially centralized on at least one of the bushing and the first and second rings.

Embodiment 116

The system of any of these embodiments, wherein the retaining ring is located on an exterior of the bushing.

Embodiment 117

A system for restraining pipes, comprising:
first and second pipes, each having an axis and a groove adjacent an axial end thereof; and
first and second rings, each configured to be removably attached to a respective one of the first and second pipes with a retaining ring, and when the system is assembled the first and second rings have fingers that interlock with each other.

Embodiment 118

The system of any of these embodiments, wherein each of the retaining rings comprises a spline.

Embodiment 119

The system of any of these embodiments, further comprising a bushing configured to bridge and hydraulically seal with the first and second pipes, and the bushing is located between the first and second pipes and the first and second rings.

This written description uses examples to disclose the embodiments, including the best mode, and also to enable those of ordinary skill in the art to make and use the invention. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

It may be advantageous to set forth definitions of certain words and phrases used throughout this patent document.

The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A pipe restraining system, comprising:
    first and second pipes, each having an axis and a clamp groove adjacent an axial end thereof;
    a bushing configured to bridge and overlap each of the axial ends of and hydraulically seal with the first and second pipes, the bushing having an axial length and a substantially constant inner diameter over the axial length;
    first and second clamp rings, each configured to removably attach the bushing to a respective one of the first and second pipes, such that when the pipe restraining system is assembled, axial tensile loads passing through the first pipe are transmitted through the first clamp ring, the bushing and the second clamp ring to the second pipe, and an axial distance between the first and second pipes remains substantially constant,
    a seal groove associated with each of the first and second pipes between the axial end and the clamp groove; and
    a seal disposed within each of the seal grooves and in contact with the inner diameter of the bushing and an outer surface of the corresponding pipe of the first and second pipes.

2. The pipe restraining system of claim 1, wherein during disassembly of the pipe restraining system and without axially moving the first and second pipes, the bushing is configured to axially slide completely over one of the first and second pipes and have no overlap with the other of the first and second pipes.

3. The pipe restraining system of claim 1, wherein each of the first and second clamp rings comprises a flange that mates with the clamp groove in a respective one of the first and second pipes when assembled.

4. The system of claim 1, wherein each of the first and second clamp rings does not comprise a full cylindrical shape.

5. The system of claim 1, wherein axial compressive loads passing through the first pipe are transmitted through the first clamp ring, the bushing and the second clamp ring to the second pipe.

6. The pipe restraining system of claim 1, wherein each seal groove is disposed in the outer surface of a respective one of the first and second pipes, and wherein each seal is compressed against the inner diameter of the bushing.

7. A coupling for forming a joint between at least two pipes, the coupling comprising:
    a bushing having a tubular profile, an axis, an axial length, a bore with an inner diameter, an exterior with an outer diameter, clamp grooves on an exterior of the bushing, and the bushing is configured to receive axial ends of the at least two pipes;
    first and second clamps, each configured to be removably attached to a respective one of the clamp grooves in the bushing and a respective one of the at least two pipes;
    a seal groove associated with each of the at least two pipes; and
    a seal disposed in each of the seal grooves and in contact with the bore of the bushing and an exterior surface of a corresponding one of the at least two pipes,
    wherein the inner diameter is substantially constant over the axial length.

8. The coupling of claim 7, wherein the bushing is configured to symmetrically straddle the at least two pipes relative to the axis, and the at least two pipes are configured to be free of contact with each other.

9. The coupling of claim 7, wherein each of the at least two pipes is configured to comprise one of the seal grooves on the exterior thereof, and each of the at least two pipes is configured to comprise one of the seals mounted in the seal groove on the exterior thereof.

10. The coupling of claim 9, wherein each seal groove is disposed between an axial end of the corresponding one of the at least two pipes and the respective clamp groove.

11. The coupling of claim 7, wherein each of the at least two pipes is configured to comprise a pipe groove on an exterior thereof, and the pipe grooves are radially offset from the clamp grooves with respect to the axis, such that the pipe grooves are not co-planar with the clamp grooves.

12. The coupling of claim 7, wherein each clamp has a pipe lip and a bushing lip extending from an interior thereof, the pipe lip is sized and spaced to cooperatively mate with a pipe groove, and the bushing lip is sized and spaced to cooperatively mate with one of the clamp grooves on the bushing to form a rigid pipe assembly.

13. The coupling of claim 7, wherein each clamp comprises semi-cylindrical clamp portions that are configured to mirror each other and form a complete cylindrical clamp around one of the pipes and the bushing when installed.

14. The coupling of claim 13, wherein the semi-cylindrical clamp portions comprise features configured to form a hinge when mated together.

15. The coupling of claim 7, wherein the clamps comprise no seals.

16. The coupling of claim 7, wherein each clamp comprises a tapered profile to reduce drag during pipe installation.

17. The coupling of claim 7, wherein the coupling is configured to comprise a hydraulically-sealed interface between the at least two pipes and the clamps are configured to maintain the at least two pipes axially spaced-apart from each other in operation including under fluid pressure, and tensile and compressive loading conditions.

18. The coupling of claim 7, wherein when the at least two pipes are assembled with the coupling, tensile loads applied axially are transferred through the clamps to the at least two pipes.

19. A coupling for forming a joint between two pipes, each of the two pipes having a clamp groove, the coupling comprising:
  a bushing having a tubular profile, an axis, an axial length, a bore with an inner diameter, an exterior with an outer diameter, and the bushing is configured to receive axial ends of the two pipes; and
  first and second clamps, each configured to be removably attached to the bushing and to a respective one of the clamp grooves in a respective one of the two pipes;
  a seal groove associated with each of the two pipes between an axial end thereof and the respective clamp groove; and
  a seal disposed within each of the seal grooves and in contact with the bore of the bushing and an outer surface of the respective one of the two pipes,
  wherein the inner diameter is substantially constant over the axial length of the bushing.

20. The coupling of claim 19, wherein each seal groove is disposed in the outer surface of a respective one of the two pipes, and wherein each seal is compressed against the inner diameter of the bushing.

21. The coupling of claim 19, wherein the bushing overlaps axial ends of both of the two pipes.

\* \* \* \* \*